(12) United States Patent
Martija et al.

(10) Patent No.: US 7,039,689 B2
(45) Date of Patent: May 2, 2006

(54) METHOD AND SYSTEM FOR DETERMINING GEOGRAPHICAL REGIONS OF HOSTS IN A NETWORK

(75) Inventors: Ricardo V. Martija, East Brunswick, NJ (US); Walter D. Sincoskie, Hampton, NJ (US); Samaradasa Weerahandi, Pittstown, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 800 days.

(21) Appl. No.: 09/774,976

(22) Filed: Jan. 31, 2001

(65) Prior Publication Data

US 2002/0169857 A1    Nov. 14, 2002

(51) Int. Cl.
G06F 15/177 (2006.01)
G06F 15/173 (2006.01)
H04Q 7/20 (2006.01)

(52) U.S. Cl. .................. 709/220; 709/223; 709/238; 455/456.1

(58) Field of Classification Search ........ 709/220–223, 709/226, 238, 241, 242, 224; 718/104, 105; 455/456.1

See application file for complete search history.

(56) References Cited

U.S. PATENT DOCUMENTS

| | | | |
|---|---|---|---|
| 5,969,679 A * | 10/1999 | Bolliger et al. | 342/464 |
| 6,223,209 B1 * | 4/2001 | Watson | 709/201 |
| 6,304,913 B1 * | 10/2001 | Rune | 709/241 |
| 6,665,715 B1 * | 12/2003 | Houri | 709/223 |
| 6,684,250 B1 * | 1/2004 | Anderson et al. | 709/225 |
| 6,724,733 B1 * | 4/2004 | Schuba et al. | 370/252 |
| 6,757,740 B1 * | 6/2004 | Parekh et al. | 709/245 |
| 6,832,253 B1 * | 12/2004 | Auerbach | 709/226 |
| 2002/0087666 A1 * | 7/2002 | Huffman et al. | 709/220 |

OTHER PUBLICATIONS

Periakaruppan et al. "GTrace—A Graphical Traceroute Tool", USENIX LISA'99, Nov. 1999.*
Padmanabhan et al. "Determining the Geographic Location of Internet Hosts" from www.research.microsoft.com/~padmanab/, Nov. 2000. Full version is Microsoft Research Technical Report MSR-TR-2000-110.*
Francis et al. "An Architecture for a Global Internet Host Distance Estimation Service" INFOCOM '99. Eighteenth Annual Joint Conference of the IEEE Computer and Communications Societies. Proceedings. IEEE , vol.: 1 , Mar. 21-25, 1999 pp.: 210-217.*

(Continued)

*Primary Examiner*—Saleh Najjar
*Assistant Examiner*—David Lazaro
(74) *Attorney, Agent, or Firm*—Joseph Giordano; James W. Falk

(57) ABSTRACT

Methods and systems are provided for determining the geographical regions of hosts in a network. A plurality of sample hosts in the network are preselected. The sample hosts are preselected such that they are located in a plurality of geographical regions that are determinable using existing methods and systems or other means. A plurality of monitoring stations are provided in the network to determine first sets of information associated with each of the sample hosts and second sets of information associated with a host whose geographical region is to be determined. The geographical region of the host is then determined to be the same as the geographical region of those sample hosts whose respective mean of first sets of information has the shortest weighted vector (or euclidian) distance from the second sets of information.

2 Claims, 5 Drawing Sheets

OTHER PUBLICATIONS

Moore et al. "Where in the world is netgeo.caida.org?" Cooperative Association for Internet Data Analysis (CAIDA), intended for INET 2000 publication. Printed from www.caida.org/outreach/papers/2000/inet_netgo/.*

Woolley "We Know Where You Live" Forbes Magazine, Nov. 13, 2000. Printed from www.forbes.com.*

Raz "Finding a host's geographical location" Printed from Internet Archive of www.private.org/IP2geo.html Sep. 22, 1999.*

"User location and tracking in an In-Building Radio Network" by Bahl et al., Microsoft Research Technical Report, MSR-TR-99-12, published Feb. 1999.*

"Determining the Geographic Location of Internet Hosts" by Padmanabhan et al., Microsoft Research Technical Report, MSR-TR-2000-110, published Nov. 2000.*

"Applied Multivariate Analysis" by Winston, S. James Press, 1972, pp. 373-383, first cited in applicants specificaiton on p. 15. provided in remarks filed Oct. 29, 2004.*

* cited by examiner

METHOD AND SYSTEM FOR DETERMINING GEOGRAPHICAL REGIONS OF HOSTS IN A NETWORK

BACKGROUND OF THE INVENTION

The present invention relates generally to communication networks, and more particularly, to methods and systems for determining the geographical location of a host in a public network, such as the Internet.

Presently, there are few tools that purportedly determine geographical locations of hosts, such as servers, routers, or any other processor with an identifiable network address in the Internet. One such tool is NetGeo, which is available through Cooperative Association of Internet Data Analysis (CAIDA) and may be accessed on-line at www.caida.org. These tools typically determine the geographical locations of hosts by parsing their associated whois records. To retrieve a whois record for a host, these tools invoke a whois command, which returns a record including a postal address of the entity to which the host belongs.

Most existing tools, such as NetGeo may provide reliable geographical information for some hosts, such as Internet routers, but fail to provide reliable geographical information for all hosts in the Internet. For example, although a whois record includes the postal address of the entity to which a host belongs, this postal address may not be the actual location of the host, especially if the host belongs to a large business, corporation, or an international Internet Service Provider (ISP). For such hosts, the whois record typically includes the registered postal address of the entity managing or controlling a host, which is likely to be the business address of the entity's headquarters and not the actual location of the host. Accordingly, the registered postal addresses in whois records are unlikely to be the actual addresses of such hosts.

However, if an entity is a small business or a university, then it is likely that the host in question may be located at the registered postal address in the associated whois record for that host. For example, "whois -h rs.internic.net monmouth.com" returns a record that includes an address registered in the "rs.internic.net" database for a second level domain name "monmouth.com." If the domain name monmouth.com belongs to a small local business, it may be inferred that a host with a name, such as "shell.monmouth.com" is located in the county of Monmouth in the state of New Jersey.

Accordingly, although most existing tools may provide reliable geographical information about hosts belonging to small entities or universities, these tools cannot provide reliable geographical information for most hosts, especially if the hosts are managed or controlled by large organizations, corporations, or international Internet Service Providers (ISPs).

DESCRIPTION OF THE INVENTION

To overcome the above and other disadvantages of the prior art, it is desired to provide methods and systems for determining geographical regions of hosts in a network, such as the Internet. Accordingly, methods and systems are provided to determine the geographical regions of hosts in a network. A region may be any geographical area including, for example, a town, city, province, state, country, and/or continent.

To determine the geographical region of a host in a network, methods and systems consistent with the present invention preselect a plurality of sample hosts in the network such that the sample hosts are located in a plurality of geographical regions that can be determined using existing tools or other means. A plurality of monitors are then provided in the network to determine first sets of information associated with each of the sample hosts and second sets of information associated with the host whose geographical region is to be determined.

Each first set of information may include, for example, the round-trip time delay and number of hops (or hosts) on a route to a sample host, as determined by a monitor. Likewise, each second set of information may include, for example, the round-trip time delay and number of hops to the host whose geographical region is to be determined.

Other information about the sample hosts and the host may also be determined and included in the first and second sets of information, respectively. The information may include geographical region information, such as the longitude and latitude of the last identifiable routers on respective routes to the sample hosts and the host, as identified by the plurality of monitors.

The geographical region of the host is then determined to be the same as the geographical region of those sample hosts whose respective mean of first sets of information has the shortest weighted vector (or euclidian) distance from the second sets of information. A weighted vector distance may include, for example, a Mahalanobis distance from a mean of the first sets of information to the second sets of information.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BEST MODE FOR CARRYING OUT THE INVENTION

Reference will now be made in detail to the preferred embodiments of the invention, examples of which are illustrated in the accompanying drawings. Wherever possible, the same reference numbers will be used throughout the drawings to refer to the same or like parts.

In accordance with an embodiment of the invention, a host locator and a plurality of monitoring stations are provided to determine the geographical regions of one or more hosts in a network. The monitoring stations may be placed at different Host locator 101 may include a processor, such as a personal computer with a network interface for sending and receiving information via one or more hosts 150 in network 100. Alternatively, host locator 101 any include a personal computer in a stand-alone configuration not connected to network 100.

Figure 1:
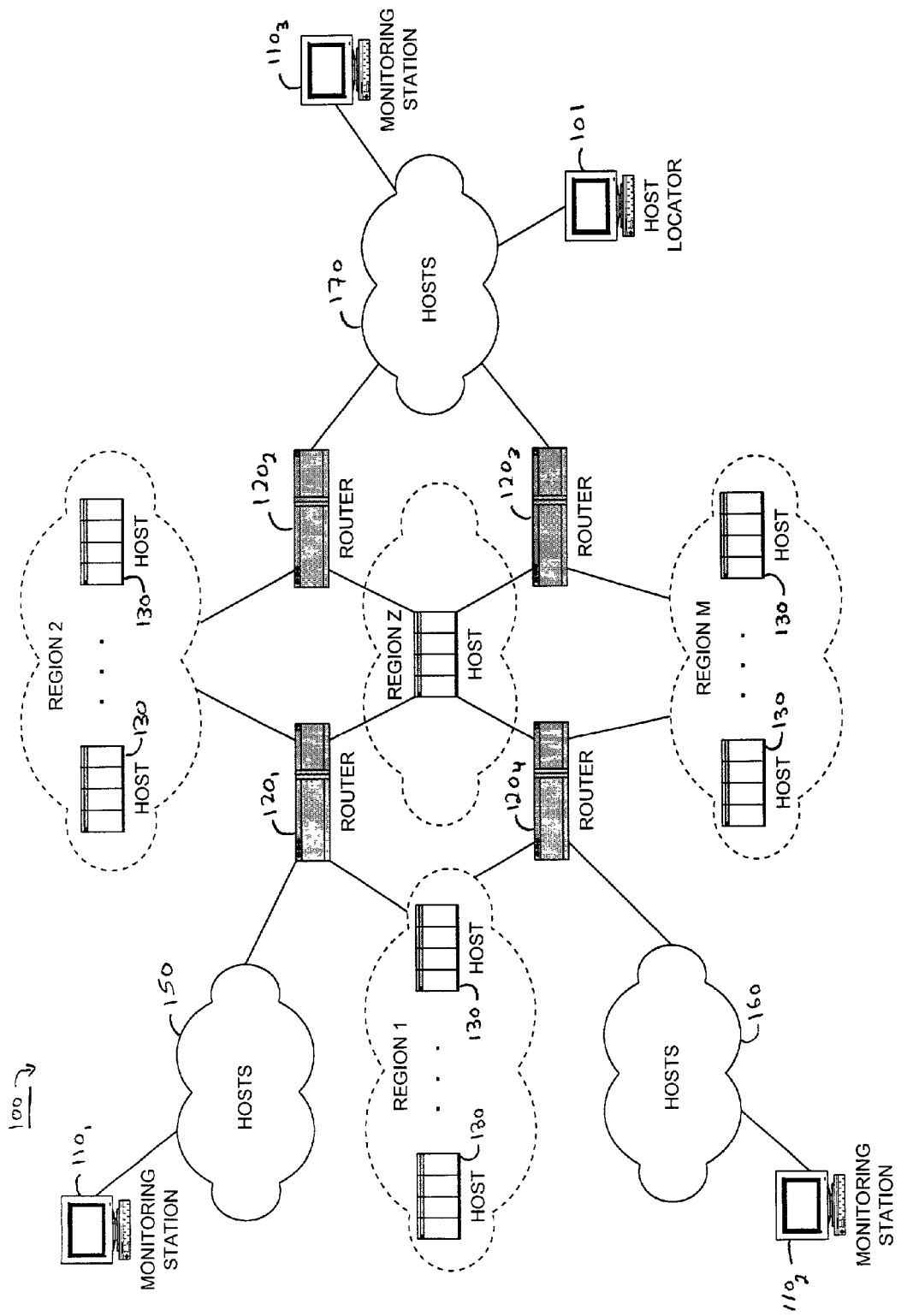
FIG. 1 is a block diagram of a network that includes a host locator and a plurality of monitoring stations for determining geographical locations of hosts in the network, in accordance with methods and systems consistent with the present invention.

The number of monitoring stations 110 in network 100 may be an integer larger than, for example, 2. For simplicity, FIG. 1 shows three monitoring stations, namely monitoring stations $110_1$, $110_2$, and $110_3$. Furthermore, monitoring stations $110_1$–$110_N$ may be capable of sending and receiving information associated with network 100 via one or more other hosts 150, 160, and 170 located in one or more geographical regions. For example, monitoring station $110_1$ may request and receive metrics information associated with host 140 via hosts 150 and router $120_1$, one or more of which may be located in different geographical regions.

Monitoring stations $110_1$–$110_N$ may be selectively placed at different points in network 100 such that the monitoring stations may request and receive a broad cross-section of information about hosts 130 and 140. For example, as described below in detail, monitoring stations $110_1$–$110_N$ may each measure certain metrics associated with hosts 130 and host 140, such as round-trip time delay and number of hosts or hops to the hosts 130 and host 140. To measure the metrics, monitoring stations $110_1$–$110_N$ may invoke a Transmission Control Protocol over Internet Protocol (TCP/IP) utility, such as the traceroute( ) routine.

Routers $120_1$–$120_R$ each may include a device that forwards packets in network 100 based on network layer and routing tables, which may be constructed by routing protocols. For simplicity, FIG. 1 shows routers $120_1$, $120_2$, $120_3$, and $120_4$, each of which connects host 140 to the rest of network 100.

Hosts 130 and host 140 may each include any device identifiable by a network address, such as an IP address, and may include one or more processors, such as a personal computer, workstation, local area network (LAN) server, microcomputer, minicomputer, mainframe, router, bridge, gateway, bank of modems owned by an Internet Service Provider (ISP), etc.

Figure 2:
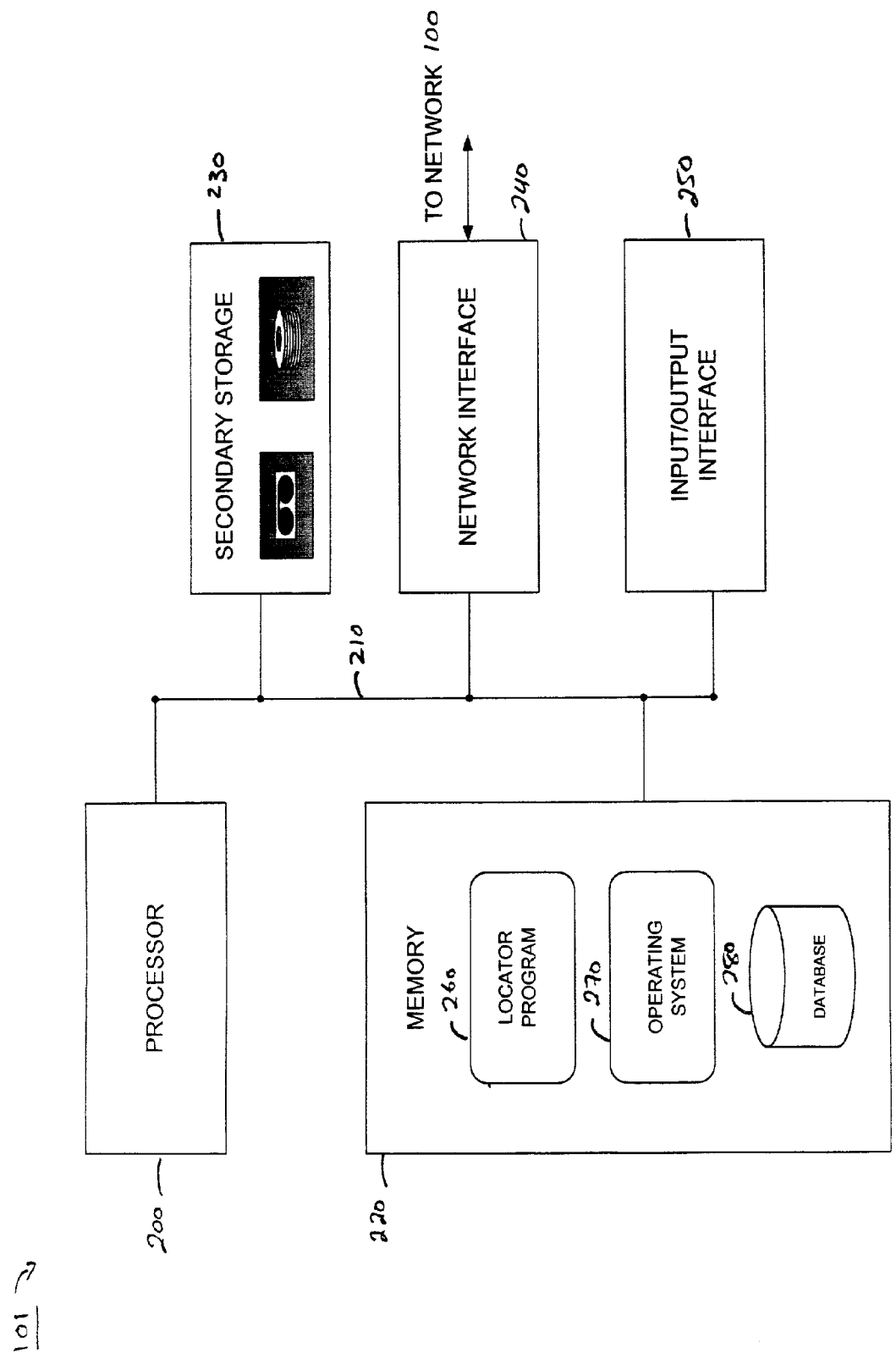
FIG. 2 is a block diagram of a host locator, in accordance with methods and systems consistent with the present invention.

FIG. 2 is a block diagram of a host locator 101, in accordance with methods and systems consistent with the present invention. As shown, host locator 101 may include a processor 200, which may connect via bus 210 to a memory 220, a secondary storage 230, a network interface module 240, and an input/output module 250.

Memory 220 may include a locator program 260, an operating system 270, and a database 280. Locator program 260 may include software, which processor 200 executes to determine geographical regions of one or more hosts, such as host 140 whose geographical region Z is to be determined.

Database 280 may include information, such as host names, host addresses, and metrics associated with hosts 130 in regions 1 through M as measured by monitoring stations $110_1$–$110_N$. A host name may include a web name, such as "www.telcordia.com." A host address may include, for example, the IP address of the host in network 100. The metrics may include, for example, round trip time delay and the number of hosts or hops to hosts 130 and host 140, as measured from each monitoring station $110_1$–$110_N$. The metrics may be downloaded over network 100 from monitoring stations $110_1$–$110_N$ onto database 280 or may be manually loaded onto a tape or diskette at each monitoring station $110_1$–$110_N$ and then copied onto database 280 via secondary storage 230.

Database 280 may also include geographical region information, such as the longitude and latitude of hosts 130 in regions 1 through M, and/or the longitude and latitude of the last identifiable routers on respective routes to hosts 130, as identified by monitoring stations $110_1$–$110_N$.

Secondary storage 230 may include a computer readable medium such as a disk drive and a tape drive. From the tape drive, software and data may be loaded onto the disk drive, which may then be copied onto memory 220. Similarly, software and data in memory 220 may be copied onto the disk drive, which may then be loaded onto the tape drive.

Network interface module 240 may include hardware and software for sending and receiving information from monitoring stations $110_1$–$110_N$ over network 100.

Input/Output interface 250 may include, for example, a key board or a key pad and a display unit.

Figure 3:
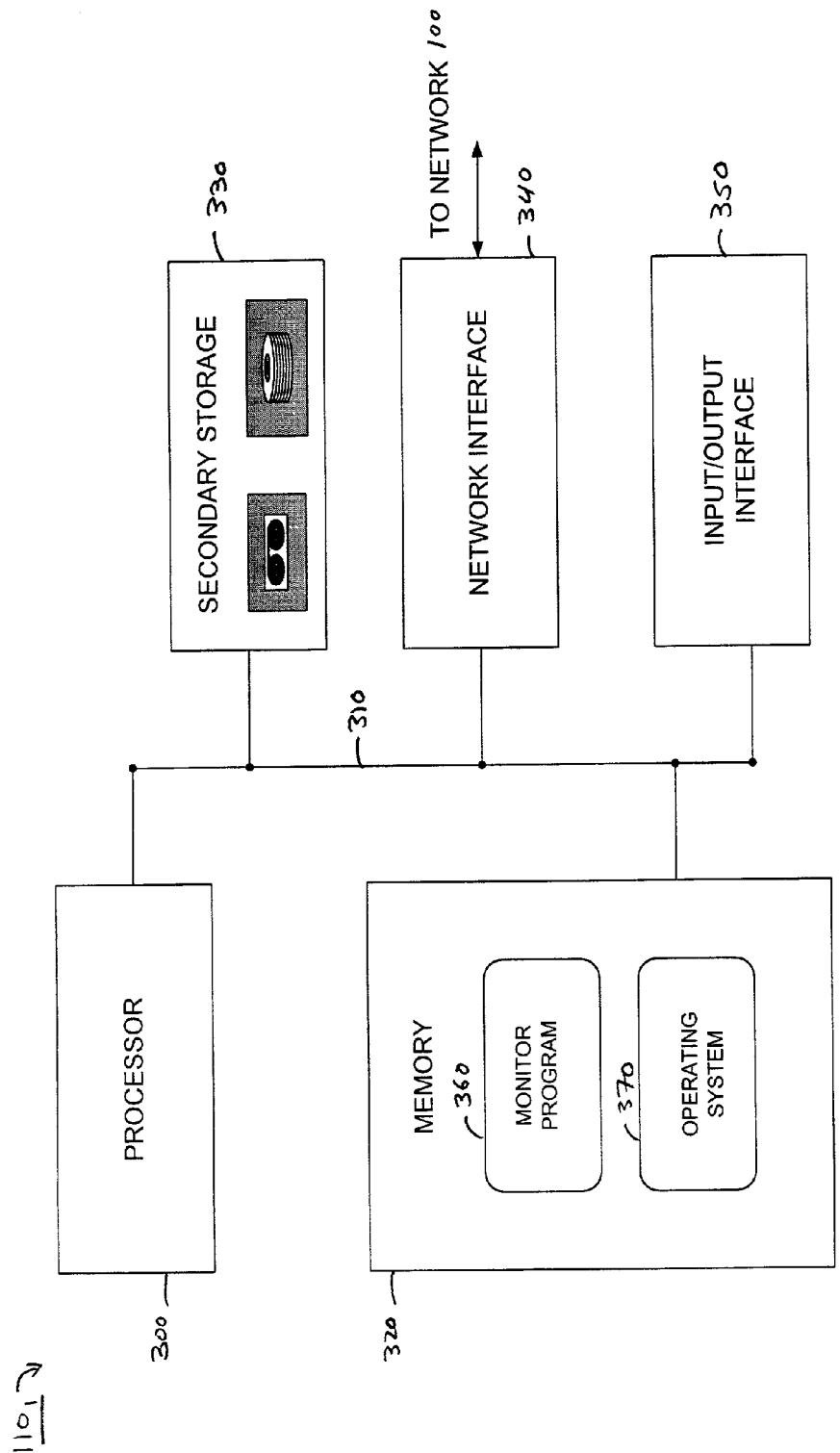
FIG. 3 is a block diagram of a monitoring station, in accordance with methods and systems consistent with the present invention.

FIG. 3 is a block diagram of a monitoring station, for example monitoring station $110_1$, in accordance with methods and systems consistent with the present invention. As shown, monitoring station $110_1$ may include a processor 300, which may connect via bus 310 to a memory 320, a secondary storage 330, a network interface module 340, and an input/output module 350.

Memory 320 may include a monitor program 360 and an operating system 370. Monitor program 360 may include software, which processor 300 executes to determine information, such as metrics and other information associated with hosts 130 and 140 in network 100. The metrics may include information, such as the round trip time delay and number of hosts or hops to hosts 130 and 140, as measured from monitoring stations $110_1$–$110_N$. The other information may include the IP addresses of routers on respective routes to hosts 130 and 140, as identified by monitoring stations $110_1$–$110_N$.

Secondary storage 330 may include a computer readable medium such as a disk drive and a tape drive. From the tape drive, software and data may be loaded onto the disk drive, which may then be copied onto memory 320. Similarly, software and data in memory 320 may be loaded onto the disk drive, which may then be loaded onto the tape drive.

Network interface module 340 may include hardware and software for sending and receiving information from network 100.

Input/Output interface 350 may include, for example, a key board or a key pad and a display unit.

Figure 4:
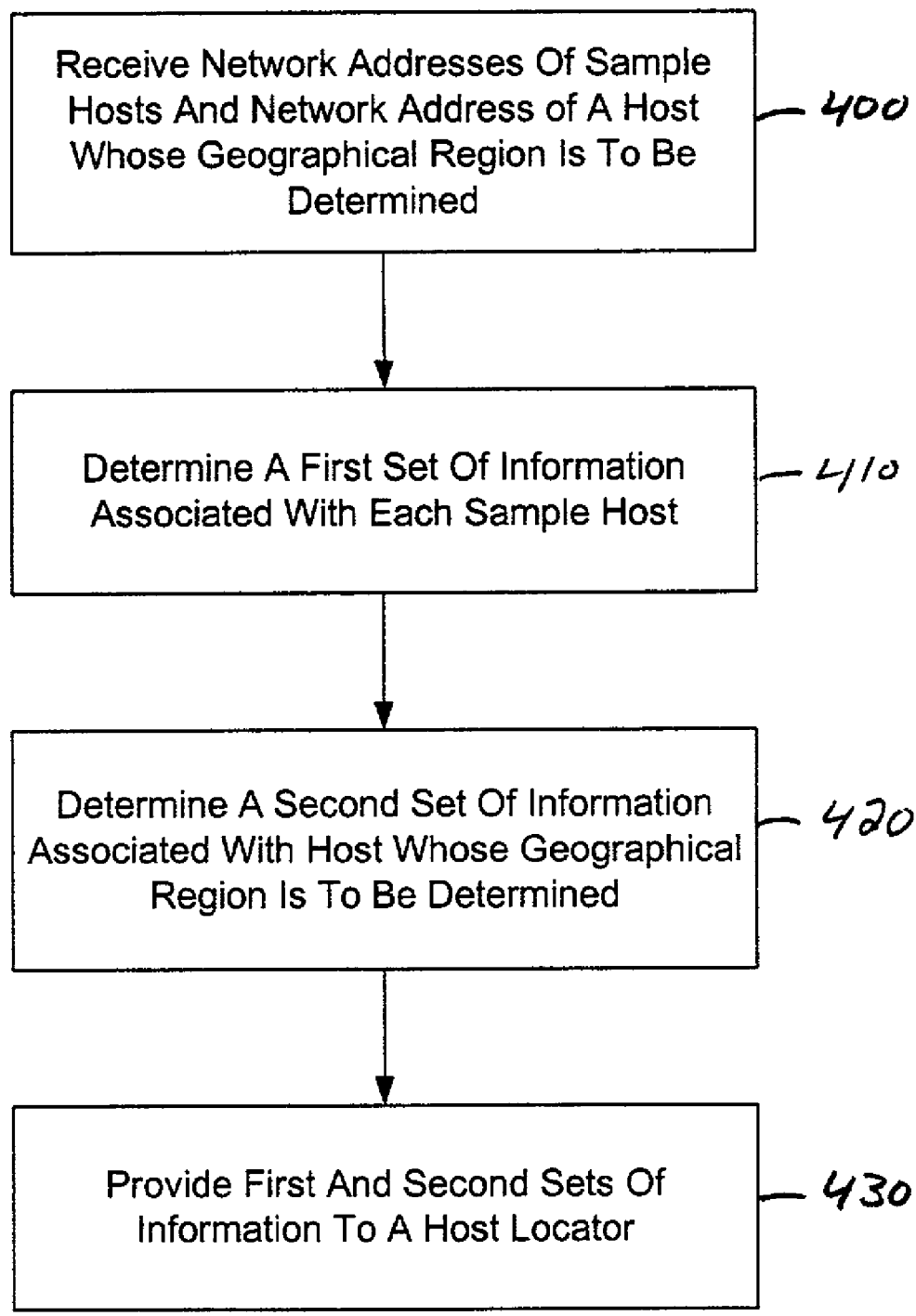
FIG. 4 is a flowchart of the steps performed by one or more monitoring stations for determining information about hosts in a network, in accordance with methods and systems consistent with the present invention.

FIG. 4 is a flow chart of the steps each monitoring station $110_1$–$110_N$ performs to determine first sets of information associated with a sample of hosts in different geographical regions, such as hosts 130 in regions 1 through M, in accordance with the methods and systems consistent with the invention. Consider monitor program 360 of monitoring station $110_1$ shown in FIG. 3. First, monitor program 360 may receive from host locator 101 a request to determine metrics and other information associated with a sample of hosts 130 and a host whose geographical region Z is to be determined by host locator 101. The request may include the host addresses of the sample hosts 130 whose geographical regions 1 through M are either predetermined or can be determined by host locator 101 and the host address of host 140 (step 400). The request may also include an indication that monitor program 360 determine portions or all of the requested information during off-peak network hours.

A user may preselect the sample of hosts 130 from hosts worldwide or from hosts in a particular region, such as a continent, country, or select states or provinces within a country. The host names and addresses associated with sample hosts 130 may be obtained from, for example, Netsizer, a tool developed and made available on-line by Telcordia Technologies, Inc. at www.netsizer.com. A Netsizer database includes the addresses and names of a large sample of hosts worldwide. The user may purchase from Telcordia Technologies, Inc. a copy of the Netsizer database and load portions or all of the information in the database onto database 280 of host locator 101.

Monitor program 360 may determine a first set of information and other information associated with each sample host 130 (step 410). For example, monitor program 360 may invoke the traceroute( ) routine using the IP address of a sample host 130 (step 410). The traceroute( ) routine returns a record that includes the round-trip time delay, number of hops (or hosts) on a route to the sample host 130, and IP addresses of all hosts including the last identifiable router on the route to the sample host 130, as identified from monitoring station $110_1$.

Based on the output of the traceroute( ) routine, monitor program 360 may include in the first set of information the round-trip time delay and number of hops on the route to sample host 130. Monitor program 360 may also determine other information associated with sample host 130, such as the IP addresses of the last identifiable routers on respective routes to sample hosts 130, as identified from monitoring station $110_1$. Monitor program 360 may repeatedly invoke the traceroute( ) routine to determine a first set of information and other information for all sample hosts 130 in regions 1 through M.

With respect to host 140, monitor program 360 may invoke the traceroute( ) routine using the IP address of host 140 to determine a second set of information and other information associated with host 140 based on the host address of host 140 (step 420). Monitor program 360 may include in the second set of information the round-trip time delay and number of hops from monitoring station $110_1$ to host 140. Additionally, monitor program 360 may identify other information associated with host 140, such as the IP address of the last identifiable router on a route from monitoring station $110_1$ to host 140. In the embodiment of FIG. 1, the output of the traceroute( ) routine may identify, for example, router $120_1$ as the last identifiable router on a route from monitoring station $110_1$ to host 140.

Finally, monitor program 360 may receive a request to download to host locator 101 the first and second sets of information and other information associated with sample hosts 130 and host 140 over network 100 (step 430). Alternatively, a user may manually copy the information determined by monitor program 360 onto a tape or diskette and load that information onto database 280 in host locator 101. As stated above, the other monitoring stations $110_2$–$110_N$ may also perform the steps 400–430 described above.

Figure 5:
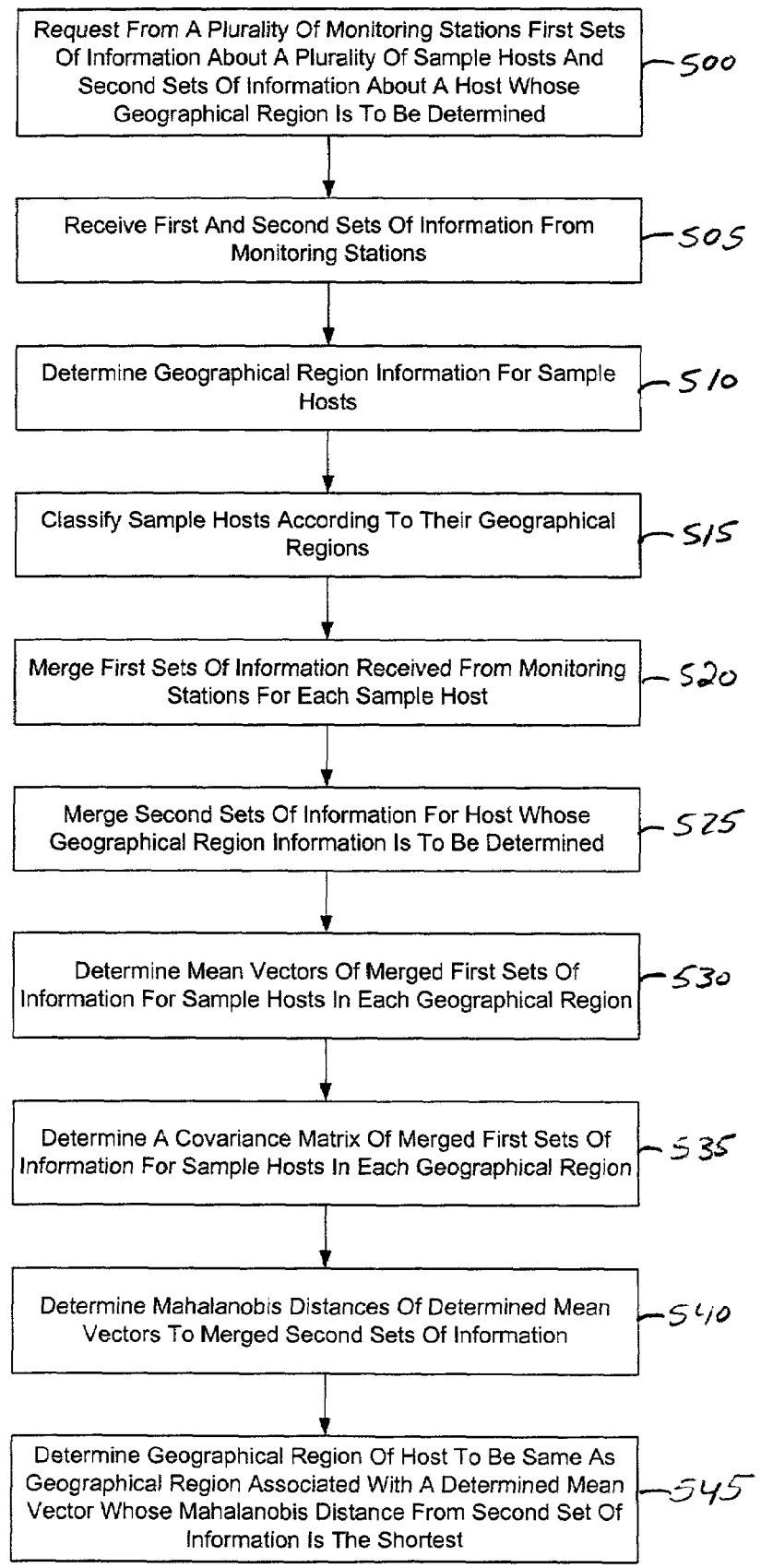
FIG. 5 is a flowchart of the steps performed by a host locator for determining the geographical region of a host in a network based on sample hosts information determined by one or more monitoring stations in the network, in accordance with methods and systems consistent with the present invention.

FIG. 5 is a flowchart of the steps host locator 101 performs to determine the geographical region of host 140, in accordance with methods and systems consistent with the present invention. Locator program 260 may send a request to each of the plurality of monitoring stations $110_1$–$110_N$, requesting metrics and other information associated with sample hosts 130 and host 140 (step 500). The request may also include an indication that each monitoring station $110_1$–$110_N$ determines portions or all of the requested information during off-peak network hours.

Locator program 260 may receive the first and second sets of information and other information from monitoring stations $110_1$–$110_N$ and store that information in database 280 (step 505), locator program 260 may determine the geographical regions of sample hosts 130 (step 510). Since some ISPs consistently include the geographical region information of hosts in host names, monitor program 360 may parse the host names (e.g., a web name) of sample hosts 130 stored in database 280 to determine the geographical regions of those sample hosts 130 whose names include this information. For example, Worldnet, an Internet Service Provider, uses a host naming format that includes information about the geographical region where a host is located. Consider the host name "los-angeles-12.ca.dial-access.att-.net." Locator program 260 may parse out the terms "los-angeles" and "ca" to determine that the host is located in the city of Los Angeles and the state of Calif.

Alternatively, if database 280 does not include sample host 130 names, locator program 260 may invoke a nslookup( ) routine using the IP address of each sample host 130 to determine its associated host name. Locator program 260 may then parse the host name to determine the geographical region of the sample host 130.

In addition, since geographical regions of certain entities, such educational institutions or universities are well known, locator program 260 may also parse the host names to identify those names that include the top level domain ".edu." After identifying such host names, locator program 260 may parse each identified host name to identify the corresponding name of a university. Locator program 360 may then map each university name to a particular geographical region, such as a country, city, state, etc.

For example, database 280 may include a mapping table (not shown) with each entry including a university name and its corresponding geographical region. For each host name including the top level domain ".edu," locator program 260 may parse out the name of the university and search the mapping table for a matching entry. If locator program 260 finds a matching entry, it associates the geographical region identified in the matching entry to the host name. Otherwise, locator program 260 may retrieve and parse the next host name in database 280.

After determining the geographical region of each sample host 130 (i.e., regions 1 through M), locator program 260 may store that information in database 280. Locator program 260 may then classify or index the first sets of information and other information associated with sample hosts 130 in database 280 according to their respective geographical regions 1 through M (step 515).

Locator program 260 may merge the first sets of information received from monitoring stations $110_1$–$110_N$ for each sample host 130 by geographical region (step 520). For example, the merged first sets of information for sample host 130$i$ in region j may be represented as follows:

$$X_{ij} = \begin{bmatrix} t_{i1j} \\ h_{i1j} \\ t_{i2j} \\ h_{i2j} \\ \vdots \\ t_{iNj} \\ h_{iNj} \end{bmatrix}$$

where j is an integer with values from 1 through M, and $t_{i1j}$–$t_{iNj}$ and $h_{i1j}$–$h_{iNj}$ represent the round-trip time delay and number of hops to sample host 130$i$ in geographical region j, as determined by monitoring stations $110_1$–$110_N$, respectively.

Similarly, locator program 260 may merge the second sets of information received from monitoring stations $110_1$–$110_N$ (step 525). The merged second sets of information Y may be represented as follows:

$$Y = \begin{bmatrix} t_1 \\ h_1 \\ t_2 \\ h_2 \\ \vdots \\ t_N \\ h_N \end{bmatrix}$$

where j is an integer with values from 1 through M, and $t_1$–$t_N$ and $h_1$–$h_N$ represent the round-trip time and number of hops to host 140, as determined by monitoring stations $110_1$–$110_N$, respectively.

Alternatively, before merging the first sets of information, locator program 260 may also determine geographical region information for each of the sample hosts 130 based on other information downloaded from monitoring stations $110_1$–$110_N$. In this embodiment, in addition to city, state, country, or continent information, locator program 260 may also determine other geographical region information, such as the latitude and longitude associated with the last identifiable routers on respective routes to sample hosts 130, as identified by monitoring stations $110_1$–$110_N$. Stated another way, locator program 260 may determine the latitude and longitude of those routers with the shortest hops to sample hosts 130 as identified by monitoring stations $110_1$–$110_N$. For example, router $120_1$ (shown in FIG. 1) may be identified by monitoring station $110_1$ as the last router on a route to each sample host 130 in region 1, while router $120_4$ may be identified by monitoring station $110_2$ as the last router on a route to each sample host 130 in region 1.

Based on the IP addresses of the last identifiable routers received from monitoring stations $110_1$–$110_N$, locator program 260 may invoke, for example, the NetGeo tool to determine the longitude and latitude of the identified routers. As explained above, the NetGeo tool is available through Cooperative Association of Internet Data Analysis (CAIDA) and may be accessed on-line at www.caida.org. For example, locator program 260 may invoke the NetGeo Application Program Interface (NetGeo API) to determine the longitude and latitude of the last identifiable routers on respective routes to sample hosts 130 in regions 1 through M, as identified by monitoring stations $110_1$–$110_N$. Further information about the NetGeo tool is available on web page http://netgeo.caida.org/perl/netgeo.cgi.

NetGeo includes a database and collection of PERL scripts used to map IP addresses, domain names, and autonomous system (AS) numbers to geographical regions. The NetGeo database includes tables for mapping location names (city, state, or country) or United States zip codes to latitude and longitude information. When NetGeo receives a request to determine the latitude and longitude of a domain name, NetGeo searches the database for a record containing the target domain name. If NetGeo finds a record for the target domain name, it returns the requested latitude and longitude information. If NetGeo does not find a matching record, it performs one or more whois lookups using the whois servers of the Internet Information Network Center (InterNIC) and/or Reseaux IP Europeens (RIPE) until a whois record for the target domain name is found. Additional information about NetGeo is available on-line at www.caida.org.

Locator program 260 may add the geographical region information determined above to the first sets of information and merge the resulting first sets of information. The merged first sets of information for sample host 130$i$ in region j may be represented as follows:

$$X_{ij} = \begin{bmatrix} t_{i1j} \\ h_{i1j} \\ lo_{i1j} \\ la_{i2j} \\ t_{i2j} \\ h_{i2j} \\ lo_{i2j} \\ la_{i2j} \\ \vdots \\ t_{iNj} \\ h_{iNj} \\ lo_{iNj} \\ la_{iNj} \end{bmatrix}$$

where j is an integer with values from 1 through M, $t_{i1j}$–$t_{iNj}$ and $h_{i1j}$–$h_{iNj}$ are as described above, and $lo_{i1j}$–$lo_{iNj}$ and $la_{i1j}$–$la_{iNj}$ represent the longitude and latitude of the last identifiable routers on respective routes to sample host 130$i$ in geographical region j, as determined by monitoring stations $110_1$–$110_N$.

Similarly, before merging the second sets of information, locator program 260 may determine geographical region information, such as the longitude and latitude of the last identifiable routers on respective routes to host 140, as identified by monitoring stations $110_1$–$110_N$. Locator program may add the geographical region information to the second sets of information and merge the resulting second sets of information. The merged second sets of information Y may be represented as follows:

$$Y = \begin{bmatrix} t_1 \\ h_1 \\ lo_1 \\ la_2 \\ t_2 \\ h_2 \\ lo_1 \\ la_2 \\ \vdots \\ t_N \\ h_N \\ lo_N \\ la_N \end{bmatrix}$$

where j is an integer with values from 1 through M, $t_1$–$t_N$ and $h_1$–$h_N$ are as described above and $lo_1$–$lo_N$ and $la_1$–$la_N$ represent the longitude and latitude of the last identifiable routers on routes to host 140, as determined by monitoring stations 110₁–110_N, respectively.

Locator program 260 may then determine a mean vector $\hat{\mu}_j$ for the merged first sets of information for sample hosts 130 in each geographical region j as follows (step 530):

$$\hat{\mu}_j = \sum_{i=1}^{n_j} X_{ij}/n_j,$$

where $n_j$ represents the number of sample hosts 130 in geographical region j.

Locator program 260 may also determine a covariance matrix $\Sigma_j$ for the merged first sets of information for sample hosts 130 in each geographical region j as follows (step 535):

$$\sum_j = \frac{1}{n_j} \sum_{i=1}^{n_j} (X_{ij} - \hat{\mu}_j)(X_{ij} - \hat{\mu}_j)^T,$$

where $^T$ signifies a transpose operation.

Based on the covariance matrices determined for geographical regions 1 through M, locator program 260 may determine a weighted vector (or euclidian) distance $d_j$ from each mean vector $\hat{\mu}_j$ to the merged second sets of information Y (step 540). For example, locator program 260 may determine the Mahalanobis distance $d_j$ from each mean vector $\hat{\mu}_j$ to the merged second sets of information Y as follows:

$$d_j = (\hat{\mu}_j - Y)^T \sum_j^{-1} (\hat{\mu}_j - Y).$$

Further information on determining a Mahalanobis distance is disclosed in "Applied Multivariate Analysis," S. James Press, Holt Rinehart Winston, pp. 373–383, 1972, which is incorporated herein by reference.

Locator program 260 determines that the geographical region of host 140 is region j whose associated mean $\hat{\mu}_j$ has the shortest weighted vector distance from the merged second sets of information Y (step 545). For example, locator program 260 may determine that the geographical region of host 140 is region j whose associated mean $\hat{\mu}_j$ has the shortest Mahalanobis distance $d_j$ from Y.

While it has been illustrated and described what are at present considered to be preferred embodiments and methods of the present invention, it will be understood by those skilled in the art that various changes and modifications may be made, and equivalents may be substituted for elements thereof without departing from the true scope of the invention. One skilled in the art will appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. This invention should be limited only by the claims and equivalents thereof.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for determining the geographical region in which is located a specific host in a wireline Internet network, said method comprising the steps of
    selecting other hosts in the Internet network, the selected other hosts being located in a plurality of known geographical regions;
    determining, at a plurality of points in the Internet network, first sets of information associated with the selected other hosts, respectively;
    determining, at the plurality of points in the Internet network, second sets of information associated with the specific host;
    classifying the selected other hosts according to their respective geographical regions;
    determining mean vectors of the first sets of information associated with the selected other hosts;
    determining Mahalanobis distances of the determined mean vectors from the second sets of information;
    selecting one of the determined mean vectors with the shortest Mahalanobis distance from the second sets of information; and
    determining the geographical region of the specific host to be the same as the geographical region of the classified other hosts whose respective determined mean vector is the selected one of the determined mean vectors.

2. The method for determining the geographical region in which is located a specific host in a wireline Internet network in accordance with claim 1 further comprising, after the step of determining the mean vectors of the first sets of information, the step of determining covariance matrices of the first sets of information associated with the selected other hosts.

* * * * *